(12) United States Patent
Yokoyama

(10) Patent No.: US 10,901,133 B2
(45) Date of Patent: Jan. 26, 2021

(54) ILLUMINATING DEVICE AND LIQUID CRYSTAL DISPLAY APPARATUS

(71) Applicant: 138 East LCD Advancements Limited, Sandyford (IE)

(72) Inventor: Osamu Yokoyama, Shiojiri (JP)

(73) Assignee: 138 East LCD Advancements Limited, Sandyford (IE)

( * ) Notice: Subject to any disclaimer, the term of this patent is extended or adjusted under 35 U.S.C. 154(b) by 0 days.

(21) Appl. No.: 14/500,821

(22) Filed: Sep. 29, 2014

(65) Prior Publication Data

US 2015/0016146 A1  Jan. 15, 2015

Related U.S. Application Data

(63) Continuation of application No. 12/533,374, filed on Jul. 31, 2009, now Pat. No. 9,279,931.

(30) Foreign Application Priority Data

Aug. 1, 2008 (JP) ................................. 2008-199363

(51) Int. Cl.
*F21V 8/00* (2006.01)
*G02F 1/13357* (2006.01)

(52) U.S. Cl.
CPC .......... *G02B 6/0038* (2013.01); *G02B 6/0055* (2013.01); *G02B 6/0078* (2013.01);
(Continued)

(58) Field of Classification Search
CPC .. G02B 6/0038; G02B 6/0055; G02B 6/0078; G02F 1/1336; G02F 1/133603;
(Continued)

(56) References Cited

U.S. PATENT DOCUMENTS

| 5,886,759 A | 3/1999 | Mashino et al. |
| 5,946,062 A | 8/1999 | Hasegawa et al. |

(Continued)

FOREIGN PATENT DOCUMENTS

| JP | 64-084507 A | 3/1989 |
| JP | 2004-178850 A | 6/2004 |

(Continued)

*Primary Examiner* — Cara E Rakowski
*Assistant Examiner* — Jessica M Apenteng
(74) *Attorney, Agent, or Firm* — Kunzler Bean & Adamson

(57) ABSTRACT

An illuminating device includes light emitting elements extending in a lengthwise direction and a light guide plate having a first principal surface for emitting light from the light emitting elements and a second principal surface facing the first principal surface. The light guide plate has light guide regions corresponding to the light emitting elements. The light emitting elements overlap the light guide plate on a side of the second principal surface of the light guide plate in plan view. The side of the second principal surface of the light guide plate has first sectional surfaces, on which light originated from each of the light emitting elements is incident. The side of the second principal surface of the light guide plate has second sectional surfaces, each having a reflection surface for reflecting the light originated from each light emitting element toward the first sectional surface, corresponding to the light emitting elements.

17 Claims, 12 Drawing Sheets

(52) U.S. Cl.
CPC ...... *G02F 1/133605* (2013.01); *G02F 1/1336* (2013.01); *G02F 1/133603* (2013.01); *G02F 1/133609* (2013.01); *G02F 1/133611* (2013.01); *G02F 1/133621* (2013.01); *G02F 2001/133601* (2013.01); *G02F 2001/133612* (2013.01); *G02F 2001/133613* (2013.01); *G02F 2203/30* (2013.01)

(58) Field of Classification Search
CPC ......... G02F 1/133605; G02F 1/133609; G02F 1/133611; G02F 1/133621; G02F 2001/133601; G02F 2001/133612; G02F 2001/133613; G02F 2203/30
USPC .................................................. 362/611, 616
See application file for complete search history.

(56) References Cited

U.S. PATENT DOCUMENTS

| | | | |
|---|---|---|---|
| 6,734,929 B2 | 5/2004 | Sugiura et al. | |
| 7,465,084 B2 | 12/2008 | Kawashima et al. | |
| 7,527,414 B2 | 5/2009 | Hung et al. | |
| 7,632,002 B1 | 12/2009 | Park et al. | |
| 7,674,029 B2 * | 3/2010 | Liu | G02B 6/0021 362/608 |
| 7,791,683 B2 | 9/2010 | Larson et al. | |
| 7,866,874 B2 * | 1/2011 | Liu | G02B 6/0083 362/285 |
| 2006/0007054 A1 | 1/2006 | Chang et al. | |
| 2006/0203513 A1 | 9/2006 | Aoki | |
| 2007/0247871 A1 | 10/2007 | Yoo | |
| 2007/0263411 A1 | 11/2007 | Schellhorn et al. | |
| 2008/0055935 A1 * | 3/2008 | Ono | G02B 6/0018 362/623 |
| 2008/0210154 A1 | 9/2008 | Nakano et al. | |
| 2009/0284956 A1 | 11/2009 | Gomi et al. | |
| 2013/0070156 A1 * | 3/2013 | Yoo | G02B 6/003 348/571 |

FOREIGN PATENT DOCUMENTS

| | | | | |
|---|---|---|---|---|
| JP | 2005-135843 A | 5/2005 | | |
| JP | 2005-268201 A | 9/2005 | | |
| JP | 2006-228635 A | 8/2006 | | |
| JP | 2006-251075 A | 9/2006 | | |
| JP | WO2007/052842 | * 10/2007 | | |
| JP | 2007-293339 A | 11/2007 | | |
| JP | 2007-323994 A | 12/2007 | | |
| JP | 2008-027740 A | 2/2008 | | |
| WO | WO-2007052842 A1 | * 5/2007 | ........... | G02B 6/0018 |
| WO | 2007/122389 A | 11/2007 | | |

* cited by examiner

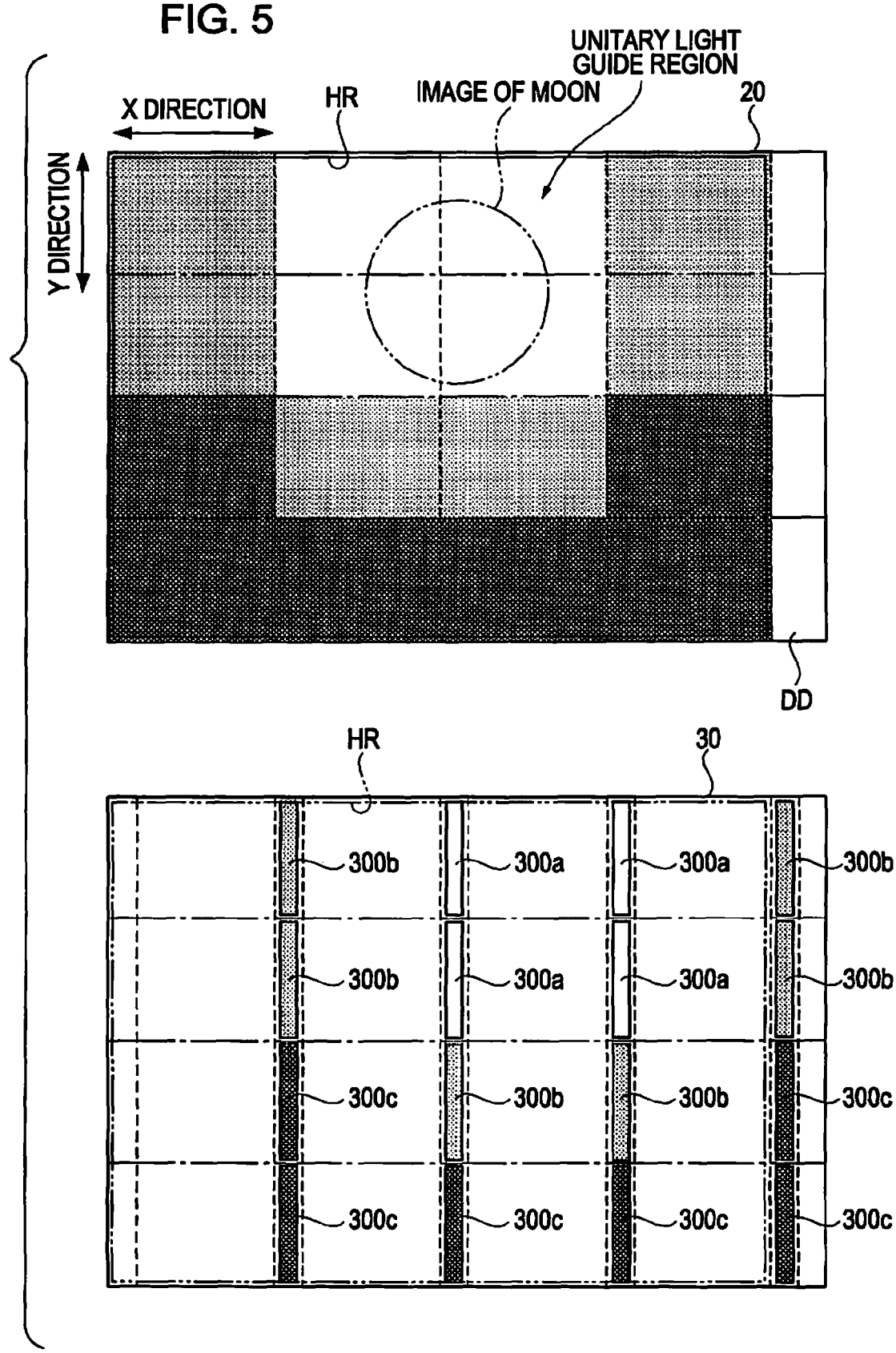

FIG. 9
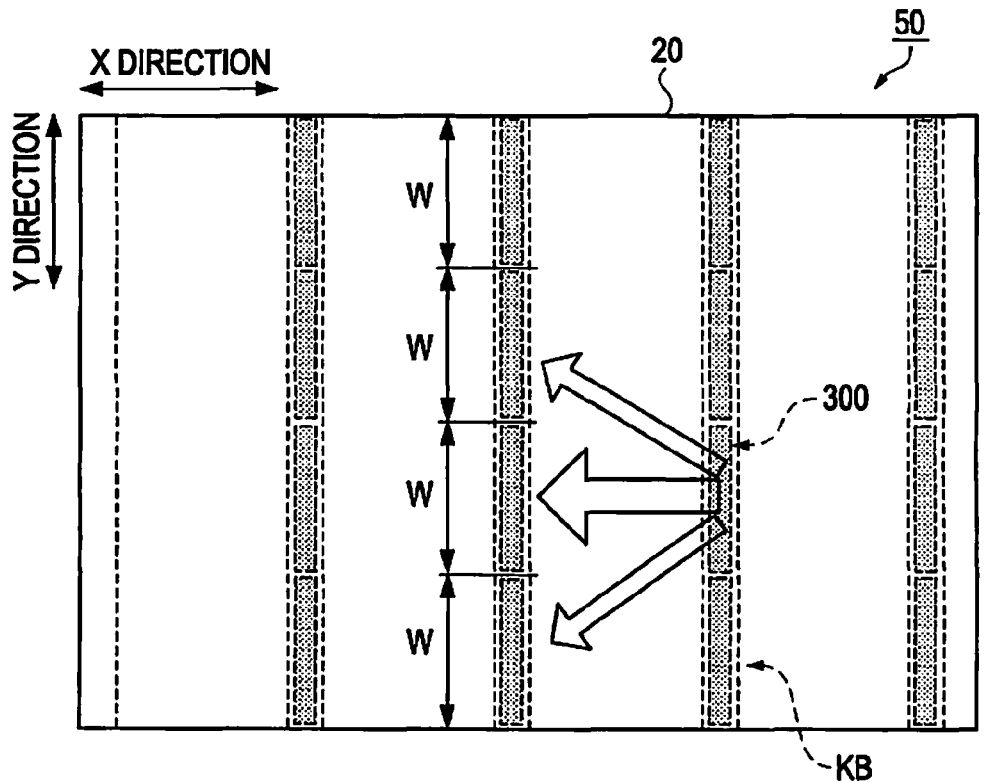
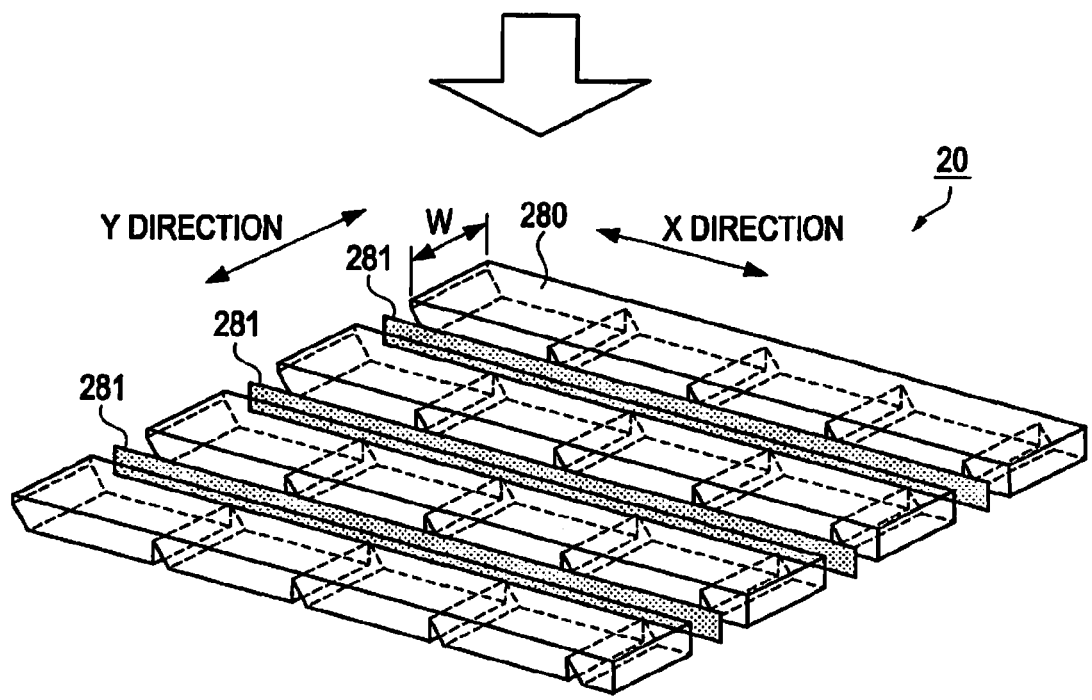

ILLUMINATING DEVICE AND LIQUID CRYSTAL DISPLAY APPARATUS

This application is a Continuation of U.S. application Ser. No. 12/533,374, filed Jul. 31, 2009 which claims priority to Japanese Patent Application No. 2008-199363 filed on Aug. 1, 2008. The foregoing patent applications are incorporated herein by reference.

BACKGROUND

1. Technical Field

The present invention relates to an illuminating device and a liquid crystal display apparatus having the illuminating device.

2. Related Art

Generally, in liquid crystal display apparatuses, a technique (it is also referred to as "local dimming") of adjusting luminance of a backlight, which is an illuminating device, has been used as a technique for improving contrast of a display image.

For example, Japanese Unexamined Patent Application Publication No. 2007-293339 discloses a technique that adjusts luminance of each light guide plate block in a way that an illumination region of the backlight is divided into a plurality of light guide plate blocks and luminance of LED (light emitting diode) disposed on each light guide plate block is adjusted.

However, in the technique disclosed in Japanese Unexamined Patent Application Publication No. 2007-293339, light emitted from the LED is light of point-light source. In this point of view, in order to turn light emitted from the LED into uniform illuminating light through the light guide plate, it is necessary to increase diffusion of light by elongating an optical path of the light guide plate. Because of this, an area of the light guide plate can not be decreased, and a size of each light guide block is restricted. Accordingly, a range of the display image capable of adjusting luminance of the backlight can not be decreased. As a result, luminance of the display region can not be minutely adjusted.

SUMMARY

The present invention has been made in order to solve at least some of the problems mentioned above, and can be realized by the following aspects or application examples.

Application Example 1

According to a first aspect of the invention, an illuminating device includes a plurality of light emitting elements constituting light emitting parts extending in a lengthwise direction; and a light guide plate having a first principal surface for emitting light originated from the light emitting elements as illuminating light and a second principal surface facing the first principal surface, the light guide plate having a plurality of light guide regions corresponding to the plurality of light emitting elements. The plurality of light emitting elements are arranged to overlap with the light guide plate on a side of the second principal surface of the light guide plate in plan view. The side of the second principal surface of the light guide plate is provided with first sectional surfaces, on which light originated from each of the plurality of light emitting elements is incident and each of which is substantially perpendicular to the first principal surface or the second principal surface, corresponding to the plurality of light emitting elements. In addition, the side of the second principal surface of the light guide plate is also provided with second sectional surfaces, each of which is disposed adjacent to the first sectional surface so as to face obliquely to the first sectional surface and has a reflection surface for reflecting the light originated from each light emitting element toward the first sectional surface, corresponding to the plurality of light emitting elements. The first sectional surfaces and the second sectional surfaces extend in the lengthwise direction of the light emitting elements, and each light emitting part of the light emitting elements and each second sectional surface are disposed so as to overlap with each other in plan view.

With such a configuration, it is possible to make light, which is originated from the light emitting element having lengthwise light emitting part, incident on the first sectional surface by reflecting the light on the second sectional surface. As a result, it is possible to make the illuminating light uniform even when the length of the light guide region from the first sectional surface is short.

Application Example 2

In the illuminating device, it is preferred that the second sectional surface be disposed to face obliquely to the light emitting part of the light emitting element.

With such a configuration, it is possible to make light, which is originated from the light emitting element, incident on the first sectional surface by changing a direction of the light by the second sectional surface. Therefore, it is possible to make light, which is originated from the light emitting element, incident effectively on the first sectional surface.

Application Example 3

In the illuminating device, it is preferred that the second principal surface of the light guide plate be provided with opening portions by the first sectional surfaces and the second sectional surfaces. In addition, it is also preferred that each opening portion be formed on the basis of a length of the light emitting part in the lengthwise direction and a width of the light emitting part in a widthwise direction crossing the lengthwise direction.

With such a configuration, the opening portions are provided to correspond to the light emitting parts. Therefore, it is possible to guide the light originated from the light emitting element into the opening portion.

Application Example 4

In the illuminating device, it is preferred that the plurality of light emitting elements be disposed such that a center of the light emitting part and a center of the opening portion substantially coincide with each other in plan view and face each other.

With such a configuration, the center of the light emitting part and the center of the opening portion can be made to coincide with each other. Therefore, it is possible to make light, which is originated from the light emitting element and reflected by the second sectional surface, incident effectively on the first sectional surface.

Application Example 5

In the illuminating device, it is preferred that the opening portions be continuously formed so as to be adjacent to each other in the lengthwise direction.

With such a configuration, the opening portions are continuously formed in the lengthwise direction of the light emitting part. Therefore, it becomes easy to form the opening portions. In addition, the light emitting elements disposed to face the opening portions are continuously arranged in lines in the lengthwise direction. Therefore, it is possible to collectively form the light emitting elements for each line in the lengthwise direction. As a result, it becomes easy to form the light emitting elements.

Application Example 6

In the illuminating device, it is preferred that the opening portions be formed in a staggered array so as to separate from each other in the widthwise direction and so as not to be adjacent to each other in the lengthwise direction.

With such a configuration, the light emitting elements are not arranged in lines in the lengthwise direction of the light emitting part. Hence, it is possible to suppress interference between the light emitting elements in the lengthwise direction. Accordingly, each light emitting region in the lengthwise direction can be formed to have the same length as the opening portion. As a result, it is possible to uniformly illuminate the display region in each light guide region.

Application Example 7

In the illuminating device, it is preferred that a reflection layer for reflecting light originated from the light emitting element be formed on the second principal surface.

With such a configuration, the light, which is originated from the light emitting element, leaking out from the second principal surface of the light guide plate is reflected and returns to the light guide plate. Therefore, it is possible to suppress loss of the illuminating light of the display region.

Application Example 8

In the illuminating device, it is preferred that light shielding units be formed on the first principal surface of the light guide plate in adjacent portions between the first sectional surfaces and the second sectional surfaces in the opening portions so as to cover the adjacent portions.

The adjacent portions between the first sectional surfaces and the second sectional surfaces are close to the light emitting elements. Hence, luminance of the illuminating light emitted from the first principal surface of the light guide plate may increase due to a shape of the adjacent portion. In this case, the display region can not be illuminated uniformly. Accordingly, with such a configuration, it is possible to shield the illuminating light at the adjacent portions of the light guide plate by using the light shielding units. Therefore, it becomes easy to uniformly illuminate the display region.

Application Example 9

In the illuminating device, it is preferred that the light emitting element be an element emitting light by applying current between a pair of electrodes formed with a thin film function layer, which includes at least a light emitting layer and is formed on a substrate, interposed therebetween.

With such a configuration, it is possible to form a thin light emitting element. Accordingly, even when the light emitting elements are disposed to face the corresponding opening portions of the light guide plate, it is possible to reduce the total thickness of the light emitting element and the light guide plate. Further, since light emitting of the light emitting element can be controlled by the applied current, it is possible to separately illuminate the display regions divided for each unitary light guide region.

Application Example 10

In the illuminating device, it is preferred that a width of the light emitting part in the widthwise direction do not exceeds a width of the opening portion in the widthwise direction. In addition, it is also preferred that a reflection film for reflecting light originated from the light emitting element be formed on a region, which overlaps with the opening portion in plan view, on the substrate other than at least the light emitting part.

With such a configuration, it can be expected that light, which is not incident on the first sectional surface and returns to the opening portion, of the light originated from the light emitting elements is reflected by the reflection film and is incident on the first sectional surface of the light guide plate. As a result, it is possible to suppress loss of the illuminating light of the display region.

Application Example 11

In the illuminating device, it is preferred that the plurality of light emitting elements be formed on one sheet of the substrate.

With such a configuration, the plurality of light emitting elements is formed on one sheet of the substrate at once. Accordingly, it is not necessary that the light emitting elements be disposed by separately adjusting the positions of those relative to the opening portions.

Application Example 12

In the illuminating device, it is preferred that the light emitting elements have substantially identical lengths in the lengthwise direction, and be divided into a plurality of the light emitting parts in the widthwise direction, and the plurality of the divided light emitting parts be elements for emitting light of mutually different colors.

With such a configuration, it is possible to obtain illuminating light of a desired color by mixing luminescent light of different colors. In addition, when the luminescent light of each color is separately emitted, it is possible to an illuminating device capable of performing local dimming on a field sequential display.

Application Example 13

In the illuminating device, it is preferred that the light emitting element be an organic EL element.

With such a configuration, the organic EL element is a light emitting element of which a light emitting region having a continuous surface shape can be formed of thin film function layers. Accordingly, when the organic EL element is used as the light emitting element, it is possible to provide thin illuminating device.

Application Example 14

In the illuminating device, it is preferred that the organic EL element be a top emission type element for emitting luminescent light toward a side opposite to the substrate.

With such a configuration, it is possible to reduce the distance between the light emitting element and the opening portion (light guide plate). Therefore, a length of the optical path from the luminescent light to the first sectional surface becomes short. As a result, it is possible to suppress loss of the illuminating light of the display region.

Application Example 15

In the illuminating device, it is preferred that the light guide plate be formed of a plurality of light guide plates divided on the basis of the light guide regions.

With such a configuration, sectional surfaces are formed between the light guide regions in the lengthwise direction or the widthwise direction. Therefore, probability that guided light between the adjacent regions is mixed becomes lower. In addition, it is possible to adjust illumination region by increasing or decreasing the number of the light guide plates. Therefore, it is possible to form light guide plates capable of easily corresponding to display regions of various sizes.

Application Example 16

It is preferred that the illuminating device further include protective members covering the light emitting elements. In addition, it is also preferred that the protective members be provided with positioning units for specifying planar positional relationship between the divided light guide plates and the light emitting elements.

With such a configuration, it is possible to suppress positional misalignment of the unitary light guide plates and the light emitting elements.

Application Example 17

According to a second aspect of the invention, a liquid crystal display apparatus has a display region for displaying an image obtained by optically modulating illuminating light through liquid crystal, and the apparatus includes the illuminating device as an illuminating device which is disposed to face the display region and emits the illuminating light.

According to the liquid crystal display apparatus having such a configuration, it possible to individually perform uniform illumination on minutely divided display regions of the display region. Accordingly, it is possible to provide a liquid crystal display apparatus capable of performing local dimming for adjusting luminance of the illuminating light for each minutely divided display region in accordance with a display image.

BRIEF DESCRIPTION OF THE DRAWINGS

The invention will be described with reference to the accompanying drawings, wherein like members reference like elements.

FIG. 3A is a partially enlarged view of the illuminating device and FIG. 3B is partially perspective view of the light guide plate for explaining the unitary light guide regions.

FIG. 5 is an explanatory diagram explaining an example of local dimming according to a display image.

FIG. 6A is a top plan view and FIG. 6B is a partially sectional view.

FIG. 9 is an explanatory diagram illustrating the light guide plate, which is divided into light guide blocks, according to the third modified examples.

FIG. 12A shows the case where the oblique angle is not 45 degrees and FIG. 12B shows the case where a thickness of the thinnest portion of a light guide plate is zero, according to a sixth modified example.

DESCRIPTION OF EXEMPLARY EMBODIMENTS

Figure 1:
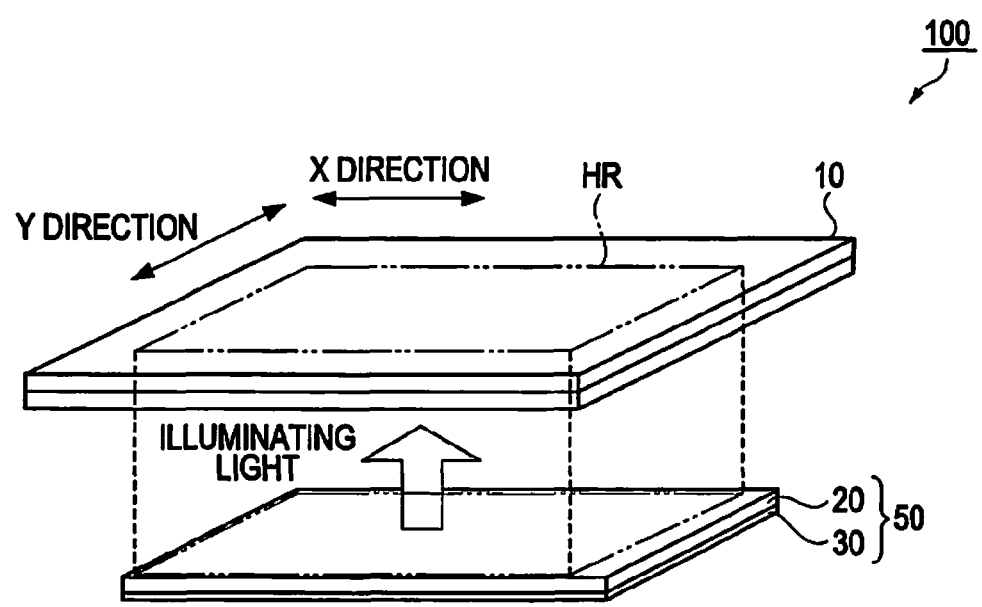
FIG. 1 is a configuration diagram illustrating a schematic configuration of a liquid crystal display apparatus as an embodiment of the present invention.

An embodiment of the present invention will be described. FIG. 1 is a configuration diagram illustrating a schematic configuration of a liquid crystal display apparatus 100 as an embodiment of the invention. The liquid crystal display apparatus 100 includes a liquid crystal panel 10 having a rectangular display region HR for displaying an image obtained by optically modulating transmitted light on the basis of image data for each pixel not shown in the drawing and an illuminating device 50 for illuminating the display region HR with light from the back side (the lower side in the drawing) opposite to the visible side of display.

Furthermore, in the embodiment, for explanatory convenience, a lengthwise direction of the display region HR is defined as an X direction, and a direction crossing the lengthwise direction is defined as a Y direction. In addition, since the drawings including FIG. 1 to be described later may be exaggerated drawings for explanatory convenience, it is apparent that the shown dimensions are not always real.

The illuminating device 50 has a configuration in which a light guide plate 20 is overlapped with a light emitting element substrate 30 by a holding member which is not shown. As shown in FIG. 1, the illuminating device 50 has almost the same size as the display region HR, and has a region for emitting illuminating light on the display region HR and a region slightly expanding in the X direction from the region. The illuminating light subjected to an optical modulating process performed by the liquid crystal panel 10 exits from a part of the surface facing the display region HR of the light guide plate 20. This embodiment makes it possible to individually illuminate minutely divided regions of the display region HR by improving the illuminating device 50.

Various display type liquid crystal panels can be used as the liquid crystal panel 10 if only it is able to display an image on the display region HR by optically modulating the transmitted light for each pixel. For example, the various display types include: vertical electric field types such as a TN (Twisted Nematic) type and a VA (Vertical Alignment) type; and horizontal electric field types such as a FFS (Fringe-Field Switching) type and an IPS (In-Plane Switching, IPS is Registered Trademark of Hitachi Displays) type. The configuration of the liquid crystal panel having such a display type is already known, and thus description of the liquid crystal panel 10 will be omitted herein.

Figure 2:
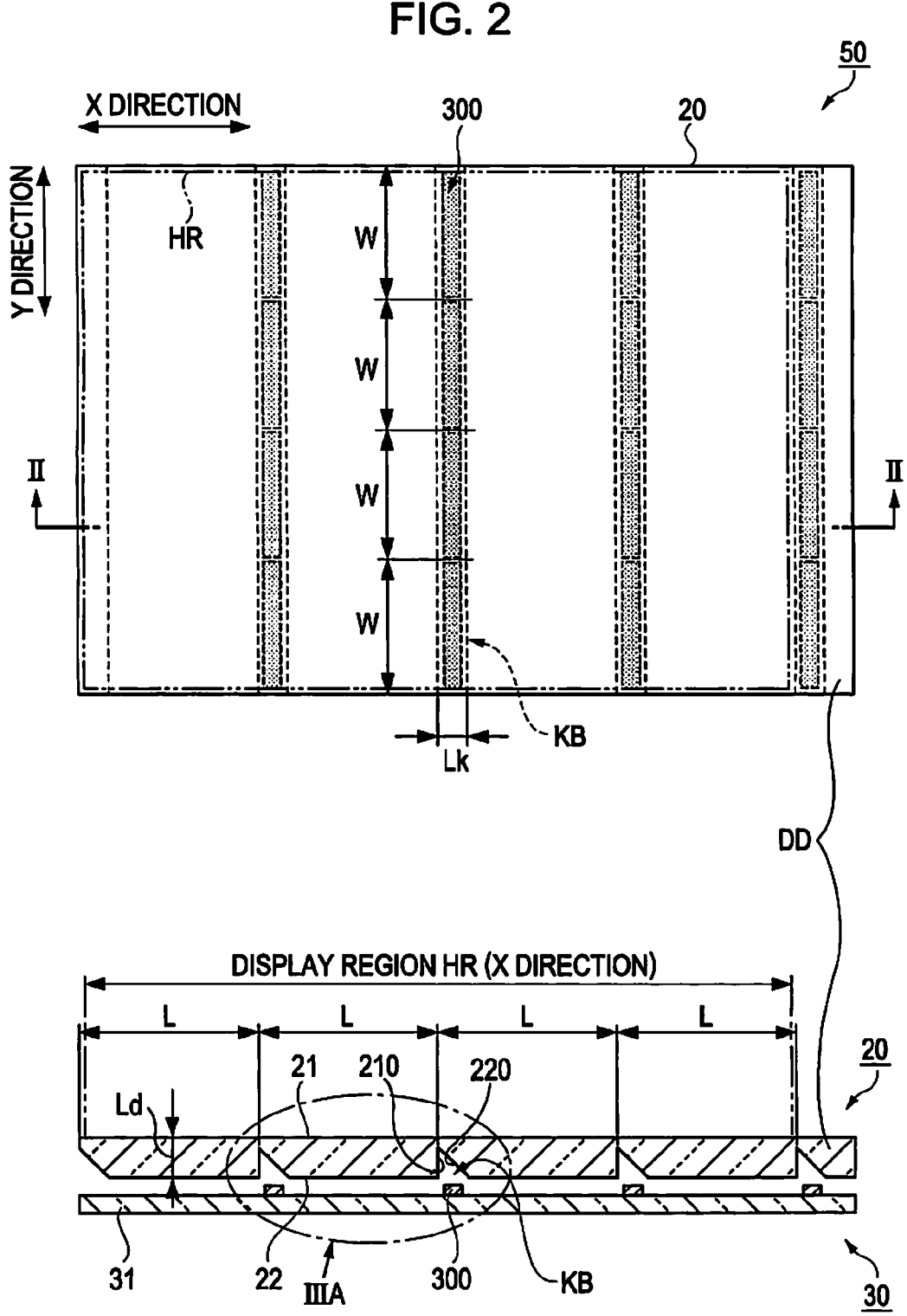
FIG. 2 is a schematic diagram illustrating a top plan view and a sectional view of an illuminating device of the liquid crystal display apparatus.

Next, the illuminating device 50 of the embodiment will be described in detail. FIG. 2 is a schematic diagram illustrating the illuminating device 50. In the drawing, the upper part shows a top plan view of the illuminating device 50 as viewed from the exit surface of the illuminating light, and the lower part shows the II-II section in the top plan view of the illuminating device 50.

The light guide plate 20 is formed in a substantially planar shape having a predetermined thickness Ld between a first flat surface (corresponding to the first principal surface in the claims) 21 facing the display region HR and a second flat surface (corresponding to the second principal surface in the claims) 22 which is the opposite surface substantially parallel to the first flat surface. In addition, a first sectional surface 210 is formed substantially perpendicular to the first flat surface 21 (or second flat surface 22), and a second sectional surface 220 is formed adjacent to the first sectional surface 210 so as to have one common side and have an oblique angle of about 45 degrees with respect to the first sectional surface 210. Furthermore, a reflection sheet for reflecting light to be described later is attached onto the second sectional surface 220.

As a result, as shown in the drawing, section in the X direction is formed in a triangular shape by the first sectional surface 210 and the second sectional surface 220. In addition, rectangular opening portions KB (which are regions indicated by the dashed lines in the drawing), each of which has a length W in the Y direction and has a length Lk in the X direction, are formed on the second flat surface 22. In the embodiment, the four opening portions KB are continuously formed in the Y direction as shown in FIG. 2. The opening portion KB has a predetermined interval which is defined as a length L in the X direction. In the embodiment, the light guide plate 20 is formed by cutting a flat plate made of a transparent resin material (for example, acryl resin) through a cutting process using a milling machine or by molding a transparent resin material (for example, acryl resin). When such a process is applied, the opening portions KB are continuously arranged in the Y direction, and the opening conditions are continuous in the Y direction. Accordingly, it becomes easy to form the opening portions KB.

On the other hand, the light emitting element substrate 30 has substantially the same size as the light guide plate 20, and is configured such that plural light emitting elements 300 (the shaded part in the drawing) are formed on a surface of the substrate 31, which is a substrate made of resin, ceramic, or glass material and having a substantially planar shape, facing the light guide plate 20. In the embodiment, each light emitting element 300 has a substantially rectangular light emitting region in which the Y direction is defined as a lengthwise direction. Thus, the four light emitting elements 300, which are adjacent to each other in the Y direction, are arranged in a line with predetermined intervals in the Y direction while securing intervals, by which the elements are able to separately emit light, at the adjacent portions therebetween. Accordingly, it is possible to form collectively the light emitting elements 300 for each line in the Y direction. As a result, it becomes easy to form the light emitting elements 300. Furthermore, in the embodiment, the Y direction corresponds to the lengthwise direction described in claims.

The light emitting elements 300 are aligned with the formation positions of the opening portions KB such that each overlapping area between the element and the opening portion KB in plan view becomes the maximum. In the embodiment, each center of the light emitting elements 300 is disposed to coincide with each center of the opening portions KB in the Y direction. In such a manner, since the center of the opening portion can be made to coincide with the center of the light emitting region, it is possible to make the luminescent light, which is reflected on the second sectional surface, be effectively incident on the first sectional surface as described later. Further, in the embodiment, since the width of the light emitting element 300 in the X direction is set smaller than the length Lk of the opening portion KB in the X direction, each center of the light emitting elements 300 is disposed to coincide with each center of the opening portions KB also in the X direction.

Figure 3A:
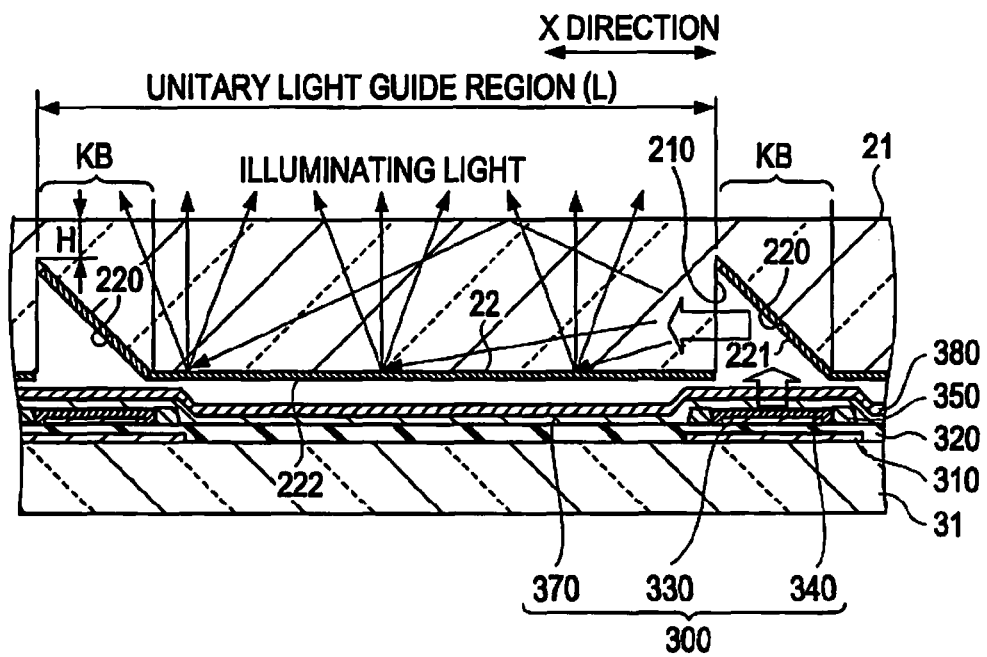
FIGS. 3A and 3B are explanatory diagrams explaining a configuration method of dividing an illumination region of the light guide plate into unitary light guide regions, where
Figure 3B:
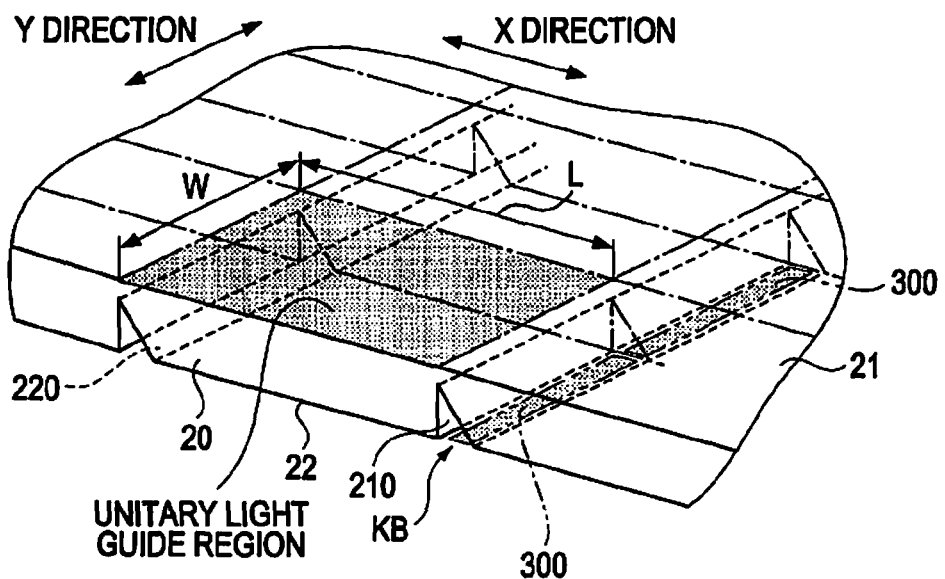

Next, by using the light guide plate 20 and the light emitting element substrate 30 configured as described above, an illumination region of the light guide plate 20 for illuminating the display region HR with illuminating light is divided into light guide regions for each light emitting element 300, that is, unitary light guide regions. This will be described with reference to FIGS. 3A and 3B. FIG. 3A is an enlarged view of a part indicated by an ellipse of the chain line in FIG. 2. In addition, FIG. 3B is partially perspective view of the light guide plate 20 for explaining the unitary light guide regions.

As shown in FIG. 3A, the light emitting element 300 is an organic EL element for emitting white light in the embodiment. Specifically, the organic EL element 340, which is interposed between an anode 330 and a cathode 370, is adapted to emit light by applying current through the anode 330 and the cathode 370. The organic EL element 340 is partitioned by a partition wall 350 which is made of insulating organic material (for example, acryl resin or polyimide resin) and is formed by an etching process and the like, thereby forming a surface region having a predetermined length in the Y and X directions. Accordingly, the organic EL element 340 serves as the light emitting element 300 having the surface region as a light emitting region.

In the embodiment, the organic EL element 340 is formed of a hole injection layer and a light emitting layer. The hole injection layer is a PEDOT (polyethylene dioxithiophene)/PSS (polystyrene sulfonate) film. The light emitting layer is a film made of a fluorescent material which appears white in color. Furthermore, in the embodiment, the light emitting layer is formed at least in an inkjet method of coating each surface region by ejecting functional liquid including an organic luminescent material. Accordingly, the light emitting layer is formed as a film having a predetermined thickness in a way that the functional liquid using a fluorescent material, which appears white in color, as a solute is ejected by a predetermined amount, and subsequently a vacuum dehydration and a heat treatment in nitrogen atmosphere are performed thereon. According to the inkjet method, the organic EL element can be formed selectively at a position corresponding to the opening portion KB on the substrate 31. As a result, an advantage is obtained in that an amount of used organic luminescent material and the like can be reduced.

However, the method of forming the light emitting layer is not limited in the inkjet method. For example, when it is difficult to coat a white-light-emissive fluorescent material in the inkjet method, the hole injection layer and the light emitting layer may be formed by a thin film formation process based on vapor deposition and an etching process based on photolithography.

The organic EL element 340 of the embodiment is a top emission type for emitting luminescent light toward the opposite side of the substrate 31. Accordingly, a reflection layer 310 made of aluminum and the like is formed on the substrate 31 side of the anode 330 made of a transparent material such as ITO (indium tin oxide) with an insulation layer 320 interposed therebetween. In normal top emission types, the reflection layer 310 is formed with the substantially the same size as the anode 330, which serves as a region of luminescent light, such that the configuration using the anode 330 in combination with the reflection layer 310 also exists. By contrast, in the embodiment, the reflection layer 310 is formed on not only a region overlapping with the anode 330 in plan view but also at least a region overlapping with a widthwise region of the opening portion KB in the X direction in plan view. In such a manner, probability that the luminescent light is incident on the light guide plate 20 becomes higher as described later.

The material of the anode 330 is not limited to a transparent material such as ITO (indium tin oxide), and may use an opaque material such as chrome. In addition, the cathode is made of a transparent material. The metallic material formed in a thin film capable of transmitting light may be used as a cathode material. In the embodiment, the cathode is used as the electron injection layer, and is formed by depositing, for example, Ca (calcium). In addition, in order to reduce an electric resistance of the Ca formed as a thin film, ITO film may be formed on the Ca film.

Moreover, the light emitting element substrate 30 is provided with a sealing film 380 for covering the cathode 370 in order to suppress degradation of the organic EL element 340. Accordingly, the light guide plate 20 and the light emitting element substrate 30 overlaps with each other so as to form a minimum gap not causing damage to the sealing film 380. Instead of the sealing film 380, a sealing sheet having a thickness of 0.1 mm or so may be used to cover the cathode 370.

However, the luminescent light originated from the light emitting element 300 is emitted toward the opening portion KB, and then is reflected by the reflection sheet 221 which is attached to the second sectional surface 220 by an adhesive and the like, as indicated by the outlined arrow. In this case, the principal optical axis of the luminescent light of the light emitting element 300 is a direction perpendicular to the light guide plate 20, and the second sectional surface 220 is inclined at about 45 degrees with respect to the first sectional surface 210. Hence, the reflected luminescent light is effectively incident on the first sectional surface 210. In addition, returning light of luminescent light toward the light emitting element 300 is reflected toward the opening portion KB by the reflection layer 310. As a result, the probability that the luminescent light is incident on the light guide plate 20 becomes higher.

The incident luminescent light is guided to the first flat surface 21 by an optical diffuser, which is not shown, formed on the second flat surface of the light guide plate 20 and a reflection sheet (or a diffusion sheet) 222, which is attached to the second flat surface by an adhesive and the like as the need arises, thereby emitting illuminating light from the first flat surface 21 toward the display region HR (not shown), as shown in the drawings. The incident luminescent light through the first sectional surface 210 has an optical path restricted by the second sectional surface 220 of the right next opening portion KB and the remaining part of the light guide plate 20 having a thickness of H ranging from the end of the second sectional surface 220 to the first flat surface 21, thereby suppressing incidence of the luminescent light into the adjacent light guide plate 20 in the X direction.

As can be seen from the description of FIG. 3A, it is preferred that the unitary light guide region not illuminating the display region HR, that is, the unitary light guide region not overlapping with the display region HR in plan view have a minimum area on which the second sectional surface 220 for reflecting the luminescent light of the light emitting element 300. Accordingly, in the embodiment, the unitary light guide region on which the second sectional surface 220 (and the reflection sheet 221) is formed in such a manner is defined as a dummy unitary light guide region DD (refer to FIG. 2).

However, in the embodiment, the light emitting region of the light emitting element 300 is a surface region. Thus, the luminescent light having a band shape continuous in the almost entire range in the Y direction is incident on the first sectional surface 210 of the unitary light guide region. Accordingly, it is possible to emit uniform illuminating light from the unitary light guide region even when a length of the optical path in the light guide plate, that is, a length L is short.

Figure 4:
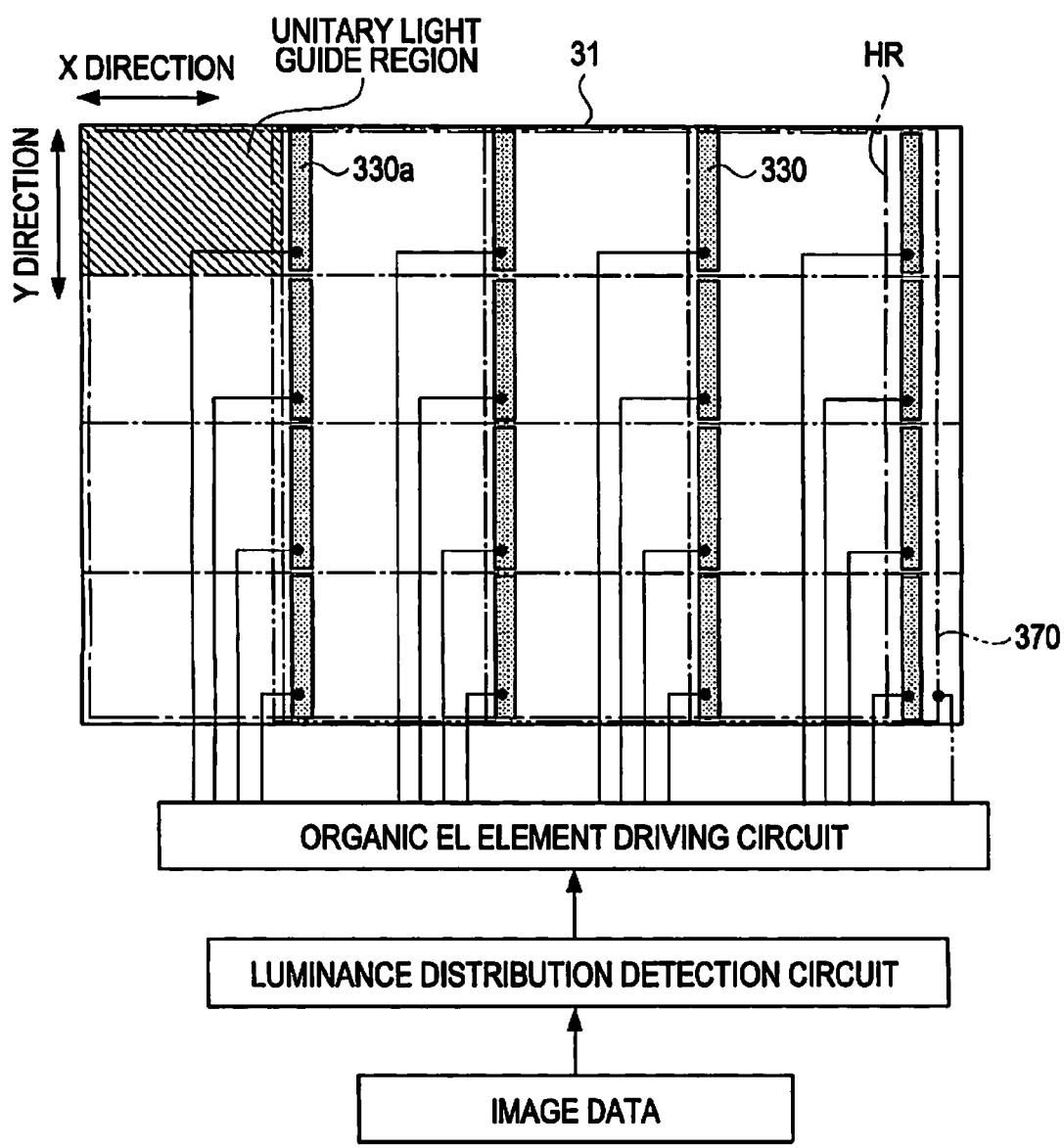
FIG. 4 is a block diagram illustrating a feature of wires connected to anodes of the corresponding light emitting elements in a light emitting element substrate.

Next, a method of individually illuminating the display region HR in each unitary light guide region, that is, local dimming will be described with reference to FIGS. 4 and 5. FIG. 4 is a block diagram illustrating the anodes 330 of the corresponding light emitting elements 300 in the light emitting element substrate 30, and a feature of wires connected to the anodes 330. FIG. 5 is an explanatory diagram explaining an example of local dimming according to a display image.

As shown in FIG. 4, the wires are formed on the substrate 31 such that the anodes 330 are individually electrically connected to an organic EL element driving circuit. Furthermore, in the embodiment, the cathode 370 for applying current between itself and the anodes 330 is formed as a common electrode overlapping with the anodes 330 in plan view without a short circuit, as indicated by the chain double-dashed line in the drawing. Likewise, the wire is formed on the substrate 31 such that the cathode 370 is electrically connected to the organic EL element driving circuit.

The organic EL element driving circuit has a function of applying current, which corresponds to an amount of luminescent light of each light emitting element 300 (not shown), between each anode 330 and the cathode 370, on the basis of a detection result of the luminance distribution detection circuit for detecting luminance distribution within the frame from image data. Specifically, the luminance distribution detection circuit detects average luminance data of a display region corresponding to each unitary light guide region from the image data displayed on the display region HR. Then, on the basis of the detected average luminance data, the organic EL element driving circuit controls the illuminating light emitted from the unitary light guide regions indicated by hatching in the drawing in accordance with the current applied between the corresponding anodes 330 and the cathode 370. Furthermore, the organic EL element driving circuit and luminance distribution detection circuit are formed integrally or separately in the liquid crystal display apparatus 100.

An example of controlling illumination luminance by controlling the current applied between the anodes 330 and the cathode 370 as described above will be described with reference to FIG. 5. FIG. 5 shows the case where the image data represents a bright image of moon rising in dark sky at night. Furthermore, the upper part of FIG. 5 shows the light guide plate 20, and the lower part shows the light emitting element substrate 30. Further, the regions partitioned by the chain line represent unitary light guide regions.

In this case, regarding the unitary light guide regions overlapping with the image of moon existing in the display region HR in plan view as an example, since the regions displays the bright image of moon, luminance of light emitted from the corresponding light emitting elements 300a is set to the maximum brightness. Regarding the unitary light guide regions adjacent to the unitary light guide regions overlapping with the image of moon in plan view, since the regions displays an image of moonlit night sky which becomes slightly bright, luminance of light emitted from the corresponding light emitting elements 300b is set to intermediate brightness. Regarding the other unitary light guide regions, since the regions displays a part of the image of dark sky at night, luminance of light emitted from the corresponding light emitting elements 300c is set to the minimum brightness. As a result, it is possible to separately perform bright illumination on a bright image part of the display region HR and separately perform dark illumination on a dark image part of the display region HR.

According to the liquid crystal display apparatus 100 of the embodiment as described above, it is possible to provide a liquid crystal display apparatus 100 capable of displaying a bright part more brightly and displaying a dark part more darkly for each divided display areas. In addition, since the organic EL element 340 of which each functional layers are formed as thin films is used as the light emitting element 300, it is possible to make the light emitting element 300 thin. Accordingly, it is possible to reduce the total thickness of the light emitting element 300 and the light guide plate 20 even when the light emitting elements 300 are disposed to face the corresponding opening portions KB of the light guide plate 20.

Furthermore, since the organic EL element 340 is a top emission type for emitting luminescent light toward the opposite side of the substrate, it is possible to decrease a distance between the light emitting element and the opening portion KB (light guide plate 20). Therefore, a length of the optical path of the luminescent light to the first sectional surface is reduced. As a result, it can be expected that the luminescent light, which is not incident from the first sectional surface, is suppressed, and thus it is possible to suppress loss of illuminating light of the display region. Further, since the plural light emitting elements 300 are formed on one substrate 31, it is not necessary to separately align positions on which the respective light emitting elements 300 are disposed to the corresponding positions of the opening portions KB.

Moreover, the luminescent light continuous in the lengthwise direction of the first sectional surface is incident by applying a plane light source element to the light emitting element 300. Hence, it is possible to make the illuminating light uniform even when a length of light guide path from the first sectional surface is short. Accordingly, it is possible to separately illuminate the divided display regions which are minutely divided by the unitary light guide regions having a short length of light guide path. In the embodiment, the illumination region for illuminating the display region HR is divided into 4 in X direction and 4 in Y direction, that is, total 16 unitary light guide regions. However, it is apparent that the illumination region can be divided so as to increase each unitary light guide region in the range in which substantially uniform illuminating light is obtainable.

The embodiment of the invention has been hitherto described, but the invention is not limited to the embodiment, and may be modified in various forms without departing from the technical spirit of the invention. Hereinafter, modified examples of the invention will be described.

First Modified Example

In the above-mentioned embodiment, the light emitting element 300 emits white light from the plane light emitting region. However, the invention not limited to this, and it is allowed to use a light emitting element having three plane light emitting regions for emitting R (red) light, G (green) light, and B (blue) light, of which mixed light appears white, respectively. For example, sometimes, it is difficult to coat a fluorescent material for emitting white light in the inkjet method. Even in this case, if it is possible to coat fluorescent materials for emitting R, G, and B light in the inkjet method, the modified example is applicable. The modified example will be described with reference to FIGS. 6A and 6B.

Figure 6A:
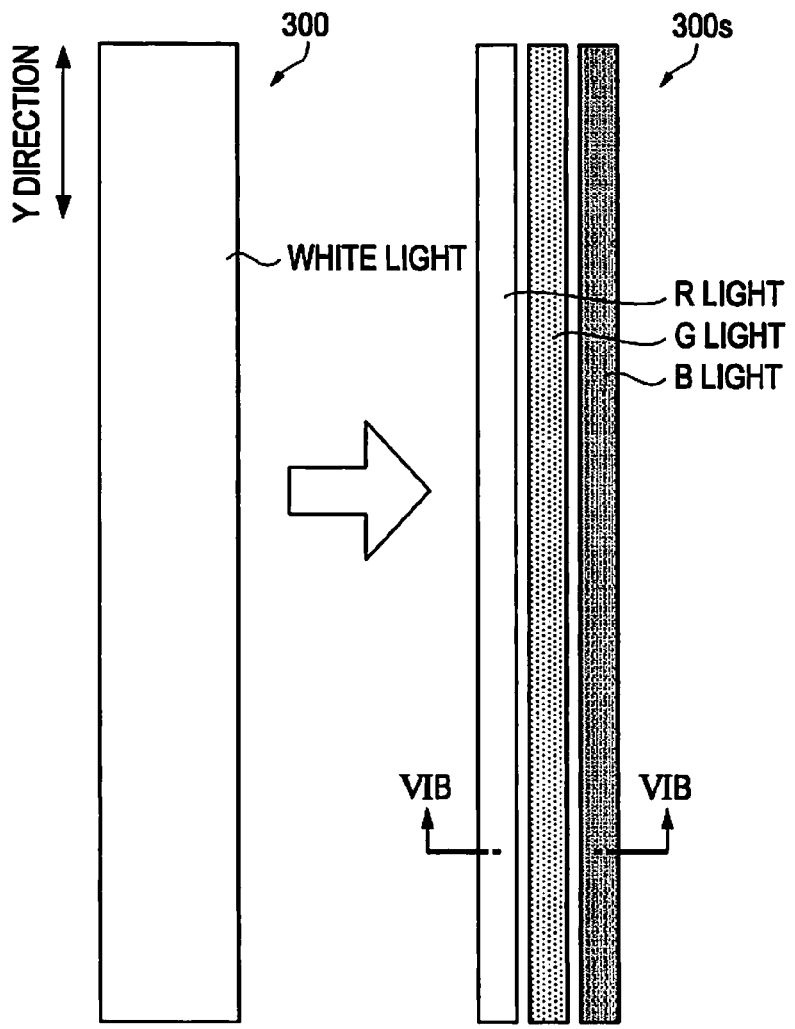
FIGS. 6A and 6B are explanatory diagrams explaining a configuration of a light emitting element according to a first modified example, where
Figure 6B:
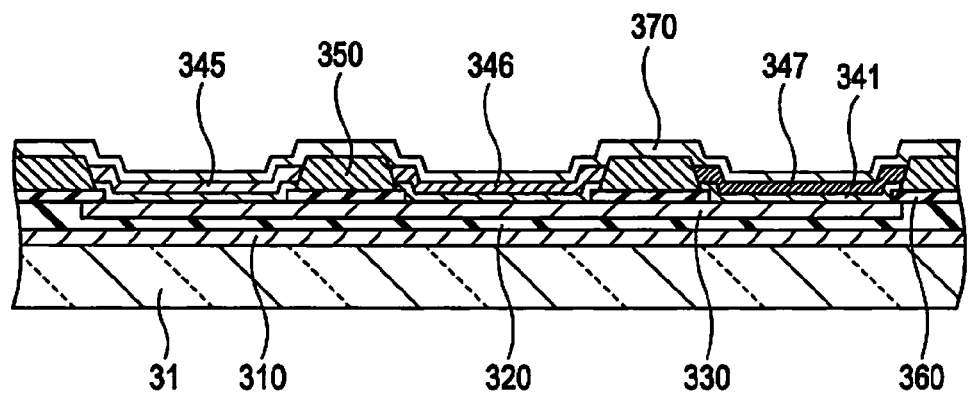

FIG. 6A is a top plan view illustrating light emitting elements 300s in which a surface region of the light emitting element 300 for emitting white light is divided into three surface regions for emitting R, G, B light. FIG. 6B is a sectional view of the line VIB-VIB in FIG. 6A.

The surface region is divided into three along the Y direction as shown in FIG. 6A. In such a manner of division, each luminescent light of R, G, and B is incident in a continuous light state in the Y direction of the first sectional surface 210 (refer to FIG. 3). Accordingly, it is possible to minimize the length of the light guide path of the unitary light guide region similarly to the above-mentioned embodiment.

An exemplary configuration of the light emitting element 300s for emitting R, G, and B light will be described with reference to FIG. 6B. As shown in the drawing, the light emitting element 300s has the three surface regions partitioned by the partition walls 350. Each surface region is provided with an organic EL element capable of emitting light of each color. As shown in the drawings, in the organic EL element, an R-light emitting layer 345, a G-light emitting layer 346, and a B-light emitting layer 347 emitting light of the corresponding colors toward the hole injection layer 341 are formed in the surface regions, respectively, between the anodes 330 and the cathode 370. Accordingly, the surface regions are formed as the light emitting element 300s for emitting luminescent light having predetermined brightness and color depending on the formed light emitting layer.

Furthermore, in the light emitting element 300s of the modified example, an inorganic insulation film 360 is formed below the partition wall 350. The inorganic insulation film 360 is formed to be projected by a predetermined width into the surface region along the outer periphery of the surface region partitioned by the partition wall 350. In addition, the hole injection layer 341 and the light emitting layers 345 to 347 are formed near the partition wall 350 by increasing a lyophilic property with respect to the functional liquids for forming the hole injection layer 341 or the light emitting layers 345 to 347. With such a configuration, it is possible to prevent a short circuit between the anode 330 and the cathode 370. Generally, it is not always necessary to form the inorganic insulation film 360 when the hole injection layer 341 or the light emitting layers 345 to 347 can be surely formed near the partition wall 350.

In the modified example, it may be possible to adopt a configuration in which the anode 330 is divided, the divided anodes are connected to the organic EL element driving circuit, and thereby the R-light emitting layer 345, G-light emitting layer 346, and B-light emitting layer 347 are individually controlled to emit light. With such a configuration, it is possible to individually control luminance of emitted light of R, G, and B, and thus it is possible to control white valance with respect to the white color obtained when the colors are mixed. Further, since it is possible to separately emit light of R, G, and B by dividing the anode 330 in such a manner, it is possible to provide an illuminating device capable of performing the local dimming on a field sequential display.

Second Modified Example

In the above-mentioned embodiment, the opening portions KB are formed continuously in the Y direction. Because of this, a length of the light emitting region of the light emitting element 300, which is disposed to overlap with the opening portion KB in plan view, in the Y direction physically becomes shorter than a length W of the opening portion in the Y direction. As a result, it is difficult to make the luminescent light incident from the entire range of the first sectional surface in the Y direction in the unitary light guide region. Accordingly, in the modified example, the opening portions KB may be formed in a staggered array so as to separate from each other in the X direction and so as not to be adjacent to each other in the Y direction.

Figure 7:
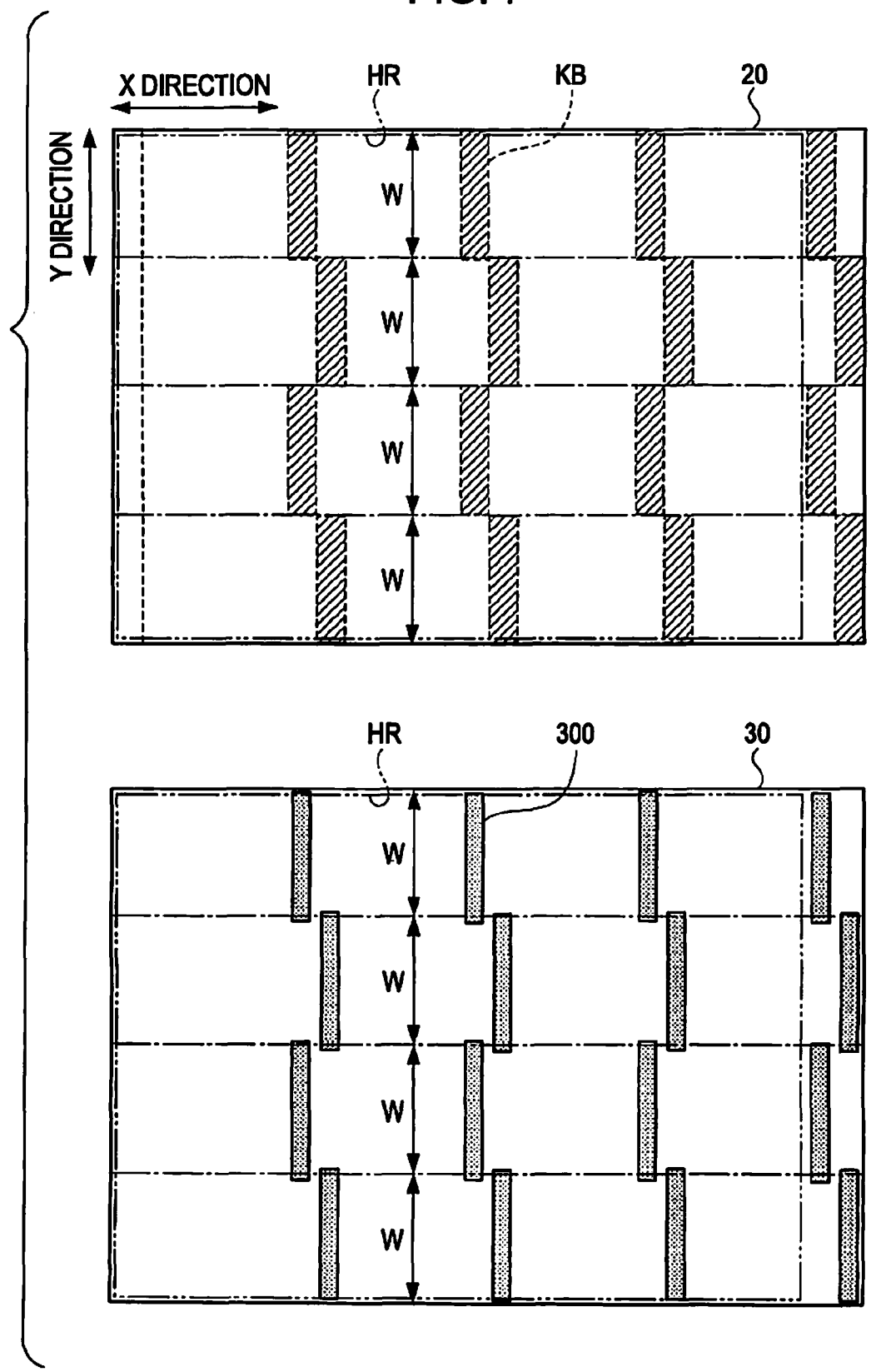
FIG. 7 is a schematic diagram illustrating a light guide plate, on which opening portions are staggered from each other, and a light emitting element substrate, on which light emitting elements are formed at positions corresponding to the opening portions, according to a second modified example.

The modified example will be described with reference to FIG. 7. FIG. 7 is a schematic diagram, where the upper part shows the light guide plate 20 formed by staggering the opening portions KB from each other in X direction, and the lower part shows the light emitting element substrate 30 in which the light emitting elements 300 are formed at positions corresponding to the opening portions KB. Furthermore, the regions partitioned by the chain line are defined as the unitary light guide regions.

As shown in the drawing, the opening portions KB are formed in the array staggered in the X direction from each other between the adjacent opening portions KB. Accordingly, the light emitting elements 300 formed at positions corresponding to the opening portions KB dose not overlap in the Y direction. As a result, since the light emitting elements 300 are not arranged in lines in the Y direction, there is no interference between the light emitting elements 300 in the Y direction. Accordingly, each light emitting region of the light emitting elements 300 in the Y direction can be formed to have a length at least not less than the length W of the opening portion KB. As a result, it is possible to make the luminescent light incident from the entire range of the first sectional surface in the Y direction in the unitary light guide region, and thus it is possible to uniformly illuminate the unitary light guide region.

Third Modified Example

In the above-mentioned embodiment, the light guide plate 20 is formed by performing a cutting process on one flat plate or a molding process. However, the invention is not limited to this, and the light guide plate 20 may be formed of divided unitary light guide plates for each unitary light guide region.

Figure 8:
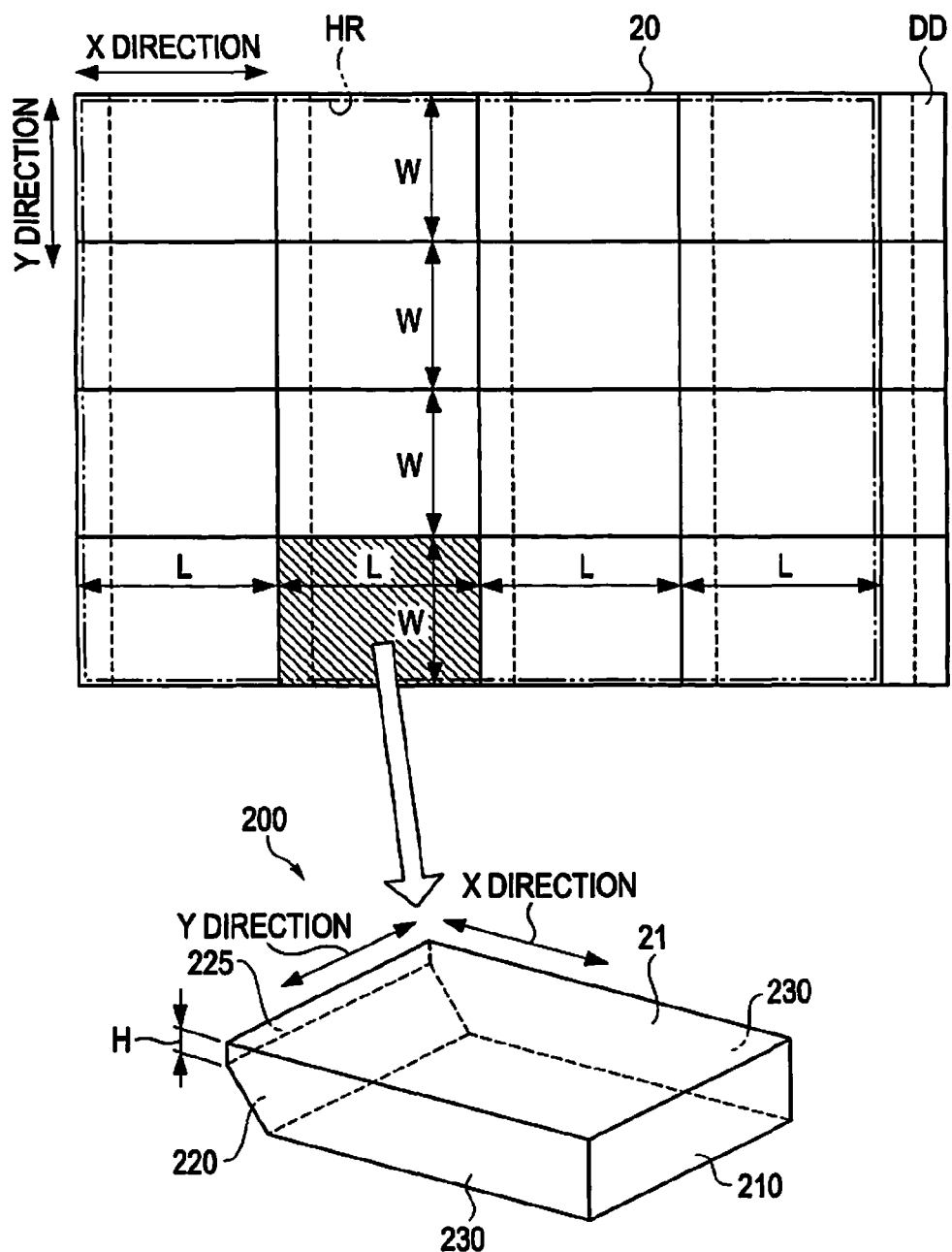
FIG. 8 is an explanatory diagram illustrating a light guide plate, which is divided into unitary light guide regions, according to a third modified example.

The modified example will be described with reference to FIG. 8. FIG. 8 shows the light guide plate 20 divided into unitary light guide regions in the part indicated by the solid lines in the drawing. In addition, the lower part of the drawing is a perspective view illustrating the one divided light guide plate, that is, the unitary light guide plate 200. Furthermore, in the modified example, the unitary light guide plates 200 are fixedly connected to each other by an adhesive.

In the unitary light guide plate 200, the luminescent light of the light emitting element 300 incident from the first sectional surface 210 is emitted as illuminating light from the first flat surface 21, that is, the unitary light guide region, as shown in the drawing. In this case, in the modified example, the light guide plate 20 is divided for each unitary light guide region. Hence, the unitary light guide plate 200 includes a third sectional surface 225 formed between itself and another unitary light guide plate adjacent thereto in the X direction and fourth sectional surfaces 230 formed between itself and another unitary light guide plate adjacent thereto in the Y direction, in addition to the second sectional surface 220 and the first sectional surface 210 formed to extend to the first flat surface 21.

Accordingly, when the light guide plate 20 is formed of the plurality of unitary light guide plates 200, a section is formed between the unitary light guide regions in the X or Y direction. Therefore, the probability that guided light between the different unitary light guide plates 200 adjacent to each other in the X and Y directions is mixed becomes lower. In addition, it is possible to easily adjust the illumination region by increasing or decreasing the number of the unitary light guide plates 200. As a result, it is possible to form light guide plates capable of easily corresponding to display regions having various sizes.

As described above, the unitary light guide regions at the edge of the light guide plate 20 in the X direction are dummy unitary light guide regions DD. Accordingly, in the modified example, the four unitary light guide plates 200 on the right side of the drawing in the light guide plate 20, which is divided as shown in FIG. 8, are the dummy unitary light guide plates 200 each of which has a short length in the X direction relative to the unitary light guide plate 200 shown by the perspective view in the lower part of the drawing.

Alternatively, another example of division of the light guide plate 20 according to the modified example may be applied, in which the light guide plate 20 is divided for each unitary light guide region in the Y direction and is formed as one flat plate in the X direction. The modified example will be described with reference to FIG. 9.

In the illuminating device 50 of the above-mentioned embodiment, the luminescent light originated from the light emitting element 300 is guided into not only the unitary light guide region located to correspond to the light emitting element 300 in the X direction but also the unitary light guide regions adjacent thereto in the Y direction (refer to the outlined arrow in the drawing), as shown in the upper part of FIG. 9. In this case, as can be understood clearly from the above-mentioned description, the case where the light amount guided in the Y direction is large is not preferred for the local dimming. Therefore, in the modified example, the light guide plate 20 is divided so as to suppress guiding light between the unitary light guide regions adjacent to each other in the Y direction, that is, light leakage.

Specifically, in the modified example, the light guide plate 20 is divided such that the total number of the light guide blocks 280 each having four unitary light guide regions continuous in the X direction is four, as shown by the perspective view in the lower part of the drawing. Therefore, the one divided light guide block 280 has a stripe shape having a width of about W in the Y direction. Accordingly, the light guide plate 20 is formed by fixedly connecting the four light guide blocks 280 in the Y direction by an adhesive and the like.

In the modified example, when the four light guide blocks 280 are fixedly connected to each other in the Y direction, optical separation sheets 281 are interposed between the light guide blocks in order to surely prevent the light leakage occurring therebetween in the Y direction. A light reflection sheet, a light diffusion sheet, a light shielding sheet, and the like can be used as the optical separation sheet 281. A light reflection layer, which is formed by coating or vapor-depositing a light reflection material (for example, aluminum and the like) on the section of the light guide block 280 fixedly connected, may be used as the optical separation sheet 281, instead of the sheet.

Furthermore, sections are formed between the unitary light guide regions in the Y direction by dividing the light guide block 280 into four. It is not always necessary to interpose the optical separation sheets 281 therebetween when light leakage between the different light guide blocks 280 adjacent to each other in the Y direction is low and the effect on the local dimming is not significant by the sections. In both end of the light guide plate 20 in the Y direction, the light guide blocks 280 are not adjacent to each other, but the optical separation sheets 281 may be fixed onto the corresponding sections by an adhesive and the like. In such a manner, it is possible to surely suppress light leakage at the ends of the light guide plate 20 in the Y direction.

Fourth Modified Example

However, when the light guide plate 20 is divided into the plural unitary light guide plates 200 similarly to the above-mentioned third modified example, it is necessary that the unitary light guide plates 200 be disposed correctly relative to the display region HR. Therefore, positioning units of the unitary light guide plates 200 may be formed on the light emitting element substrate 30 as a modified example of the above-mentioned third modified example. In such a manner, it is possible to suppress positional misalignment between each divided unitary light guide plate 200 and each light emitting element 300 in plan view.

Figure 10:
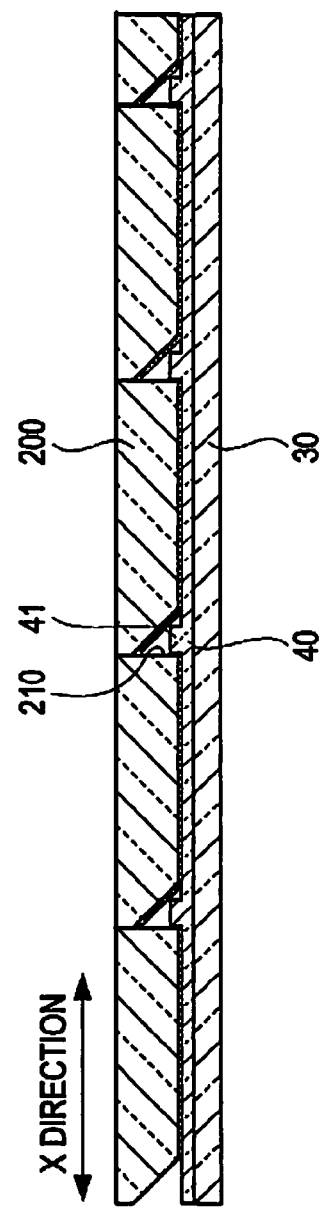
FIG. 10 is a schematic diagram illustrating a state where the divided unitary light guide plate is positioned by a sealing plate, according to a fourth modified example.

The modified example is shown in FIG. 10. FIG. 10 is a schematic diagram illustrating the arranged plural unitary light guide plates 200 and the light emitting element substrate 30 as viewed from the Y direction. In the above-mentioned embodiment, the sealing film 380 (refer to FIG. 3A) is formed to cover the cathode 370 in order to suppress degradation of the organic EL elements 340 formed on the substrate 31. However, in the modified example, instead of the sealing film 380, the sealing plate 40 made of a transparent material covers the organic EL elements 340. In addition, the sealing plate 40 is provided with projection portions 41 for engaging with the first sectional surface 210 of the unitary light guide plates 200. As a result, unitary light guide plates 200 are disposed correctly relative to the corresponding light emitting elements 300 formed on the light emitting element substrate 30.

Furthermore, the projection portions 41 can be formed by performing a mask etching process or the like on the sealing plate 40. Alternatively, special members corresponding to the projection portions 41 may be formed to be fixed onto the sealing plate 40. Further, in the modified example, the unitary light guide plates 200 are not fixedly attached to each other, and the unitary light guide plates 200 may be fixed onto the sealing plate 40 by an adhesive, similarly to the above-mentioned embodiment.

Fifth Modified Example

When the light guide plate 20 is divided into the unitary light guide plates 200 similarly to the above-mentioned third modified example, there is a concern that the luminescent light of the light emitting elements 300 leaks out from the adjacent portions between the first sectional surfaces 210 and the third sectional surfaces 225, thereby non-uniformly illuminating the display region HR. In such a case, it is preferred that the light shielding unit for shielding the adjacent portions from which the luminescent light leaks out be formed.

Figure 11A:
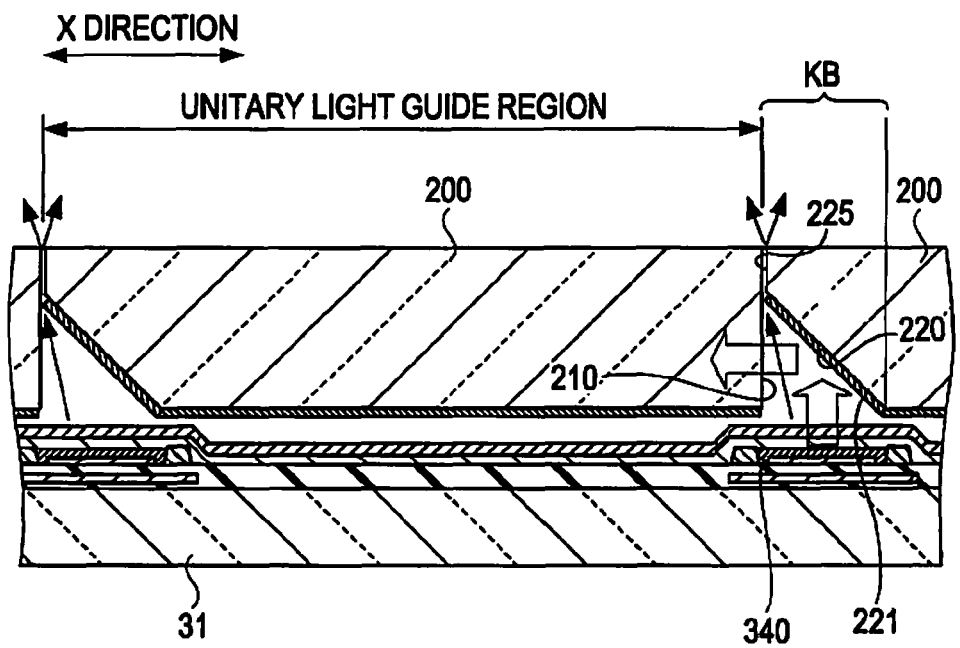
FIG. 11A is an explanatory diagram illustrating leakage light from adjacent portions between unitary light guide regions and FIG. 11B is an explanatory diagram illustrating shielding plates for shielding the leakage light, according to a fifth modified example.
Figure 11B:
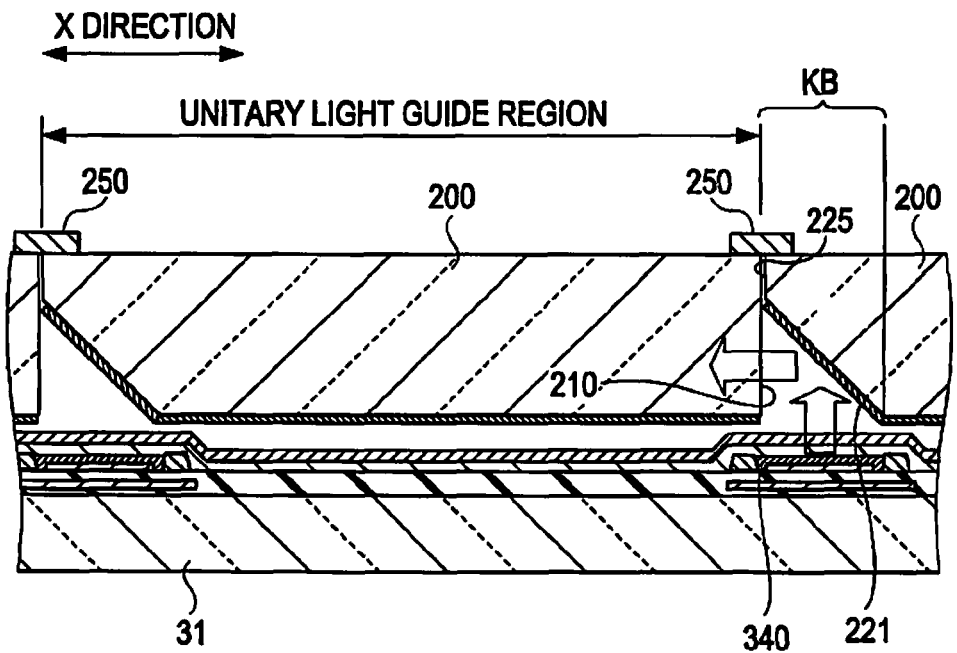

Since the light emitting elements are disposed close to the adjacent portions between the unitary light guide plates 200 in the X direction, luminance of the illuminating light emitted from the adjacent portions may be high. In this case, it is difficult to uniformly illuminate the display region HR. For this reason, by adopting the above-mentioned configuration, illuminating light from the adjacent portions between unitary light guide plates 200 can be blocked, and thus it is possible to uniformly illuminate the display region. The modified example will be described with reference to FIGS. 11A and 11B. FIGS. 11A and 11B are schematic diagrams illustrating a feature of the adjacent portions between the unitary light guide plates 200.

As shown in FIG. 11A, there is a gap between the first sectional surface 210 of the unitary light guide plate 200 and the third sectional surface 225 of another unitary light guide plate 200 adjacent thereto. The gap has a short distance from the light emitting element 300 disposed to overlap, in plan view, with the opening portion KB existing at the position of the gap, that is, organic EL element 340. Therefore, there is leakage light (the arrows) leaking out from the gap, independent of the reflection sheet 221 attached to the second sectional surface 220.

For this reason, as shown in FIG. 11B, the shielding plate 250 as the light shielding unit is attached to cover the gap between the first sectional surface 210 of the unitary light guide plate 200 and the third sectional surface 225 of another unitary light guide plate 200 adjacent thereto. In the modified example, a resin plate of which a surface is provided with a metal for reflecting light is used as the shielding plate 250. Generally, a resin plate or a metal plate may be used if only the material has no optical transparency. Furthermore, it is preferred that a length of the resin plate in the X direction be set as short as possible so as not to reduce the illuminating light. Further, it is also preferred that a thickness of the resin plate be set as thin as possible so as not to increase the total thickness of the illuminating device 50.

Furthermore, in the modified example, the shielding plate 250 is provided to the gap existing between the unitary light guide plates 200 adjacent to each other in the X direction when the light guide plate 20 is formed to be divided into unitary light guide plates 200, but the invention is not limited to this. For example, in the case where the luminescent light also leaks out from the gap existing between the unitary light guide plates 200 adjacent to each other in the Y direction, the shielding plate 250 may be provided to the gap. In this case, the shielding plate is formed in a lattice shape in plan view.

Moreover, in the case where the light guide plate 20 is not divided into the unitary light guide plates 200 similarly to the above-mentioned embodiment, a thickness of the light guide plate 20 is small between the unitary light guide regions adjacent to each other in the X direction. Hence, leakage of the luminescent light may occur. In this case, the shielding plate 250 may be provided between the unitary light guide regions adjacent to each other in the X direction. Furthermore, in this case, instead of the shielding plate 250, a material such as metal or resin having a light shielding characteristic may be formed as the light shielding unit by vapor deposition or coating.

Sixth Modified Example

Figure 12A:
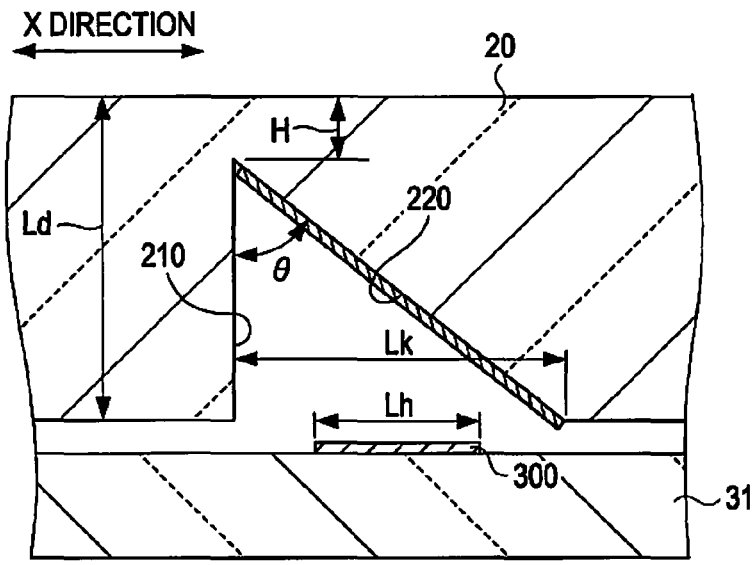
FIGS. 12A and 12B are diagrams explaining an oblique angle between a first sectional surface and a second sectional surface, where
Figure 12B:
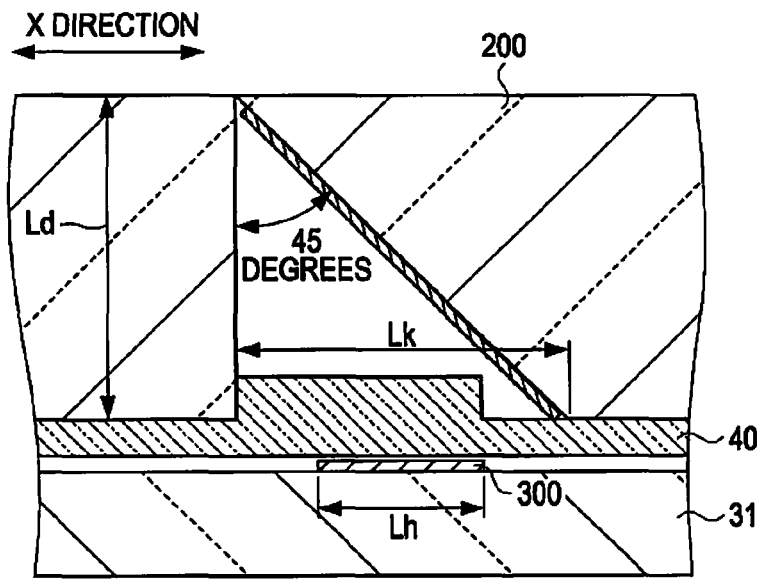

In the above-mentioned embodiment, the second sectional surface 220 is inclined at 45 degrees with respect to the first sectional surface 210, but the invention is not limited to this. This will be described with reference to FIGS. 12A and 12B. FIG. 12A is a sectional view illustrating the adjacent portion between the unitary light guide regions of the light guide plate 20. FIG. 12B is a sectional view illustrating the adjacent portion between the unitary light guide plates 200.

For example, it is preferred to change an inclination angle of the second sectional surface 220 in accordance with a length Lk of the opening portion KB in the X direction when the length Lk is adjusted in accordance with a length Lh of the light emitting surface region of the light emitting element 300 in the X direction, as shown in FIG. 12A. For example, In the above-mentioned embodiment, when the thickness Ld of the light guide plate 20 is set to 1 mm, the thickness H of the thinnest part of the light guide plate 20 is set to 0.2 mm, and the inclination angle of the second sectional surface 220 is set to about 45 degrees, the length Lk of the opening portion KB in the X direction is 0.8 mm. Here, when the length Lk of the opening portion KB in the X direction is set to 1 mm in accordance with the length Lh of the light emitting surface region of the light emitting element 300 in the X direction, the inclination angle θ of the second sectional surface 220 is derived as θ=51.3 in terms of Tan θ=1/0.8=1.25. In this case, regarding the luminescent light of the light emitting element 300, an incident angle of reflection light incident on the first sectional surface 210 changes in accordance with the inclination angle of the second sectional surface 220. Therefore, it is preferred to change the inclination angle of the second sectional surface 220 in an allowable range, in which it has no effect on the light guiding state, based on a pretest.

However, when the light guide plate 20 is divided into the unitary light guide plates 200 and is fixed onto the sealing plate 40 similarly to the above-mentioned fourth modified example, the thickness H of the thinnest part of the light guide plate can be set to "zero" as shown in FIG. 12B. In this case, for example, when the thickness Ld of the light guide plate 20 is set to 1 mm, the inclination angle of the second sectional surface can be set to 45 degrees by setting the length Lk of the opening portion KB in the X direction to 1 mm. In addition, it is preferred that the length Lk of the opening portion KB in the X direction be set to 1 mm when the length Lh of the light emitting surface region of the light emitting element 300 in the X direction is set to 0.5 mm, that is, about a half of the length Lk. The length Lk of the opening portion KB in the X direction may be generally set to be equal to the length Lh of the light emitting surface region of the light emitting element 300 in the X direction.

The Other Modified Examples

In the above-mentioned embodiment, the second sectional surface 220 is formed at the left edge of the light guide plate 20 in the X direction as shown in FIG. 2. However, it is not always necessary to form the second sectional surface 220 since the unitary light guide region does not exist on the left side of the left edge. Furthermore, in the above-mentioned modified example, the second sectional surface 220 is formed on the divided unitary light guide plate 200 at the left edge of the light guide plate 20 in the X direction, as shown in FIG. 8. However, it is not always necessary to form the second sectional surface 220 since the unitary light guide plate also does not exist on the left side of the left edge.

In the above-mentioned embodiment, the lengthwise direction of the display region HR is defined as the X direction and the other direction is defined as the Y direction, but the invention is not limited to this. The lengthwise direction of the display region HR may be defined as the Y direction. In this case, the lengthwise direction of the opening portion KB is defined as the X direction.

In the above-mentioned embodiment, the number of the substrate 31 on which the light emitting elements 300 are formed is set to one, the substrate 31 may be divided into four substrates each of which is provided with the light emitting elements 300 corresponding to the four opening portions KB adjacent to each other in the Y direction, respectively. With such a configuration, it is possible to use four substrates each of which is provided with connection wires between four light emitting elements 300 and the organic EL element driving circuit. Accordingly, since the four substrates are separately disposed relative to the opening portions KB, it is possible to separately adjust disposition of each of the four substrates.

In the above-mentioned embodiment, the top emission type organic EL element is used as the light emitting element 300, but the bottom emission type for emitting luminescent light from the substrate 31 may be used. In this case, the substrate 31 is made of a transparent material. Moreover, it is also allowed that convex portions (or concave portions) are formed on a surface opposite to the surface of the substrate 31, on which the light emitting elements 300 are formed, by the etching process, and the divided unitary light guide plates 200 are positioned and fixed by the formed convex portions (or concave portions).

In the above-mentioned embodiment, the organic EL element is formed as the light emitting element, but the invention is not limited to this, and the inorganic EL element may be used. In addition, the light emitting element is not limited to an electro luminescence element, and thus, instead of the electro luminescence element, anything may be used if only it functions as a light emitting element. For example, a light emitting diode (LED) may be used. Here, it is needless to say that such a light emitting element has a light emitting region formed as a surface region.

The entire disclosure of Japanese Patent application No. 2008-199363, field Aug. 1, 2008 is expressly incorporated by reference herein.

What is claimed is:
1. An illuminating device comprising:
a plurality of light emitting elements constituting light emitting parts extending in a lengthwise direction; and
a single light guide plate formed over the plurality of light emitting units having a first principal surface for emit- ting light originated from the light emitting elements as illuminating light and a second principal surface facing the first principal surface, the light guide plate having a plurality of light guide regions corresponding to the plurality of light emitting elements, wherein the plurality of light emitting elements are arranged to overlap with the light guide plate on a side of the second principal surface of the light guide plate in plan view, wherein the side of the second principal surface of the light guide plate is provided with first sectional surfaces, on which light originated from each of the plurality of light emitting elements is incident and each of which is substantially perpendicular to the first principal surface or the second principal surface, corresponding to the plurality of light emitting elements, and second sectional surfaces, each of which is disposed adjacent to the first sectional surface so as to face obliquely to the first sectional surface and has a reflection surface for reflecting the light originated from each light emitting element and outside of light guide plate toward the first sectional surface and into the light guide plate, each reflection surface corresponding to a corresponding one of the plurality of light emitting elements, wherein the first sectional surfaces and the second sectional surfaces extend in the lengthwise direction of the light emitting elements, and each light emitting part of the light emitting elements and each second sectional surface are disposed so as to overlap with each other in plan view, wherein the plurality of light emitting elements are disposed below the entire second sectional surface, wherein a plurality of first reflection layers are disposed on the second sectional surfaces and a plurality of second reflection layers are disposed under each of the plurality of light emitting units so as to overlap the light emitting elements in planar view, wherein the first reflection layers and second reflection layers are formed opposite to each other with each of the corresponding light emitting elements being formed between a corresponding first reflection layer and second reflection layer, and wherein the plurality of light guide regions are arranged in a configuration for individually controlling an amount of the illuminating light to be emitted from each of the plurality of light guide regions.

2. The illuminating device according to claim 1, further comprising:

a luminance distribution detection circuit configured to detect average luminance information of a display region corresponding to each of the plurality of light guide regions; and a driving circuit coupled to the luminance distribution detection circuit, the driving circuit configured to control the amount of the illuminating light emitted from each of the plurality of light guide regions based on the detected average luminance information.

3. The illuminating device according to claim 1, wherein the second sectional surface is disposed to face obliquely to the light emitting part of the light emitting element.

4. The illuminating device according to claim 1, wherein the second principal surface of the light guide plate is provided with opening portions by the first sectional surfaces and the second sectional surfaces, and each opening portion is formed in accordance with a length of the light emitting part of the light emitting element in the lengthwise direction and a width of the light emitting part in a widthwise direction crossing the lengthwise direction.

5. The illuminating device according to claim 1, wherein the plurality of light emitting elements are disposed such that a center of the light emitting part and a center of the opening portion substantially coincide with each other in plan view and face each other.

6. The illuminating device according to claim 1, wherein the opening portions are continuously formed so as to be adjacent to each other in the lengthwise direction.

7. The illuminating device according to claim 1, wherein the opening portions are formed in a staggered array so as to separate from each other in the widthwise direction and so as not to be adjacent to each other in the lengthwise direction.

8. The illuminating device according to claim 1, wherein a reflection layer for reflecting light originated from the light emitting element is formed on the second principal surface.

9. The illuminating device according to claim 1, wherein light shielding units are formed on the first principal surface of the light guide plate in adjacent portions between the first sectional surfaces and the second sectional surfaces in the opening portions so as to cover the adjacent portions.

10. The illuminating device according to claim 1, wherein the light emitting element is an element emitting light by applying current between a pair of electrodes formed with a thin film function layer, which includes at least a light emitting layer and is formed on a substrate, interposed there between.

11. The illuminating device according to claim 10, wherein a width of the light emitting part in the widthwise direction does not exceed a width of the opening portion in the widthwise direction, and a reflection film for reflecting light originated from the light emitting element is formed on a region, which overlaps with the opening portion in plan view, on the substrate other than at least the light emitting part.

12. The illuminating device according to claim 10, wherein the plurality of light emitting elements is formed on one sheet of the substrate.

13. The illuminating device according to claim 1, wherein the light emitting elements have substantially identical lengths in the lengthwise direction, and are divided into a plurality of the light emitting parts in the widthwise direction, and the plurality of the divided light emitting parts are elements for emitting light of mutually different colors.

14. The illuminating device according to claim 13, wherein the plurality of divided light emitting parts are individually controlled to control the luminance of the emitted light of each of the mutually different colors.

15. The illuminating device according to claim 1, wherein the light emitting element is an organic EL element.

16. The illuminating device according to claim 15, wherein the organic EL element is a top emission type element for emitting luminescent light toward a side opposite to the substrate.

17. The illuminating device according to claim 1, further comprising:

protective members covering the light emitting elements, wherein the protective members are provided with positioning units for specifying planar positional relationship between the divided light guide plates and the light emitting elements.

* * * * *